UNITED STATES PATENT OFFICE.

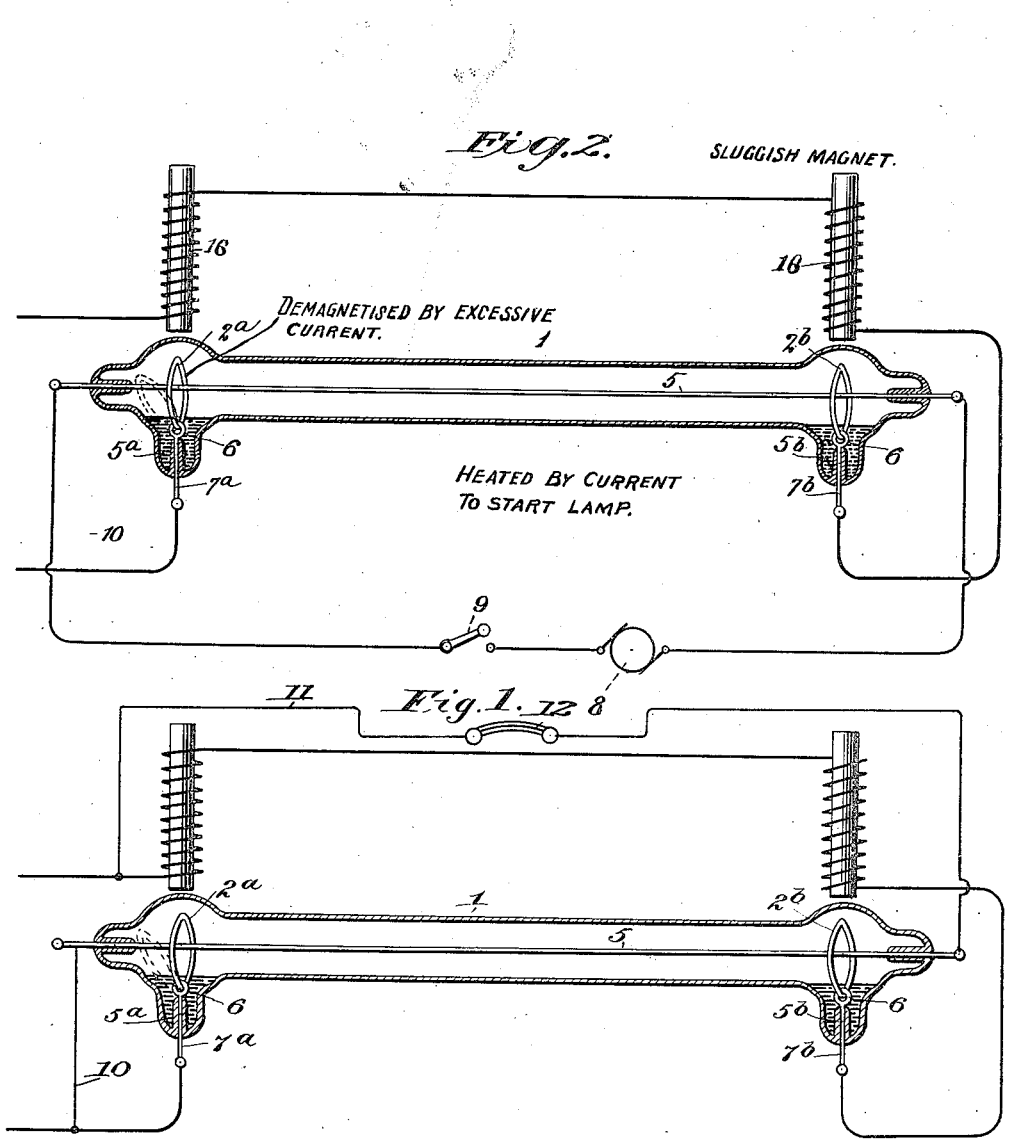

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

GAS OR VAPOR ELECTRIC APPARATUS.

1,064,686.    Specification of Letters Patent.    Patented June 10, 1913.

Original application filed March 23, 1901, Serial No. 52,488. Divided and this application filed September 18, 1902. Serial No. 123,874.

*To all whom it may concern:*

Be it known that I, PETER COOPER HEWITT, a citizen of the United States, and a resident of New York, in the county of New York and State of New York, have invented certain new and useful Improvements in Gas or Vapor Electric Apparatus, of which the following is a specification.

My invention relates to that class of electric apparatus in which the conducting medium is a vapor or gas. The apparatus may be used as a lamp or source of light or for various other purposes. In certain patents issued to me on the 17th day of September, 1901, for example, United States Patent #682,690 and 682,695, I have described various forms of vapor or gas electric apparatus, and the present invention relates more particularly to means for conveniently starting and operating lamps or other gas or vapor electric apparatus in which the phenomena at the negative electrode constitute an important part of the resistance to starting.

I have found that in an apparatus having a vapor or gas path intervening between the negative and positive electrode, under certain conditions of purity, there is an apparent reluctance on the part of the current to enter the negative electrode. I have further found that the tendency of the current is to assume a path between the positive electrode and that portion of the negative electrode which is remote therefrom. For instance, in a tube of considerable length constituting the inclosing chamber of the apparatus, if a conducting rod constituting an extension of the negative electrode be extended through a considerable portion of the length of the tube, the current will enter the negative electrode at a point, generally speaking, as remote as possible from the positive electrode, instead of traversing the extended conductor. The exact explanation of this phenomenon is not essential to a description of my invention. From experiments which I have made, however, I believe that it is proven beyond reasonable doubt that the current tends to remain in the vapor path as long as possible before entering the negative electrode.

For the purpose of starting the apparatus, I sometimes employ some special means for overcoming the initial reluctance of the current to traverse the space immediately surrounding the negative electrode. I have found, however, that by making an actual electrical connection between the positive and negative electrodes and then separating the two while current is flowing, it will continue to flow under the influence of a moderate difference of potential, the negative resistance to starting having thus been eliminated.

I avail myself of the phenomenon of the reluctance of the current to enter the negative electrode by extending one of the electrodes of the apparatus to a point near the other electrode and providing means for first bringing the two electrodes into electrical contact and then causing a break or open space to be made between the two whereupon the current which is first established at the junction is caused to pass through the vapor and immediately traverse the gas or vapor path of the apparatus, entering the negative electrode at a point remote from the positive electrode. Many different means may be employed for securing the initial contact between the electrodes and obtaining the break in the continuity thereof.

For the purpose of illustration, I may select an apparatus containing mercury as the negative electrode, and I may cause a rod of some conducting material to pass from the negative electrode into and through a considerable length of vapor, that is to say, through practically the entire operating vapor path. In electrical contact with the remote end of this rod, I may bring the positive electrode (which may be of iron or other suitable material), and I may arrange the parts so that one or the other of the two electrodes shall be movable, whereby it shall be made possible to bring the electrodes into contact or separate them at will, or I may use a bridging piece for the same purpose. In order to render the operation of the movable electrode automatic, it may be of iron or I may connect with it a piece of magnetic material, such as iron, and I may cause this iron piece to be acted upon by a magnet or solenoid outside the inclosing vessel. By including the two electrodes in the circuit of the magnet or solenoid, when the electrodes are in contact, I may cause the initial current passing through the contacting electrodes to separate the contacts and to bring about the condition in which the current selects the vapor path instead of the path through the solid extension of the negative electrode. Other means of separating the electrodes may be employed.

In the accompanying drawing, Figure 1 shows one form of device suited for the purposes of the invention; and Fig. 2 illustrates a modification.

In the drawings, I have illustrated a form of apparatus in which the extension of the negative electrode is completely cut-out of circuit when the apparatus is in operation.

The inclosing tube or chamber of a gas or vapor electric device is shown in the drawing at 1. A conductor, 5, extends through the entire length of the tube or chamber, and may be regarded as a part or extension of the negative electrode of the device, the true negative electrode being shown as a mass or puddle of mercury, $5^a$ or $5^b$, near the opposite side of the device. The conductor 5 is shown as being surrounded near its respective ends by rings, $2^a$ and $2^b$, which, when the device is not in operation lie against the rod 5, being pivoted at 6, 6, and connected with the external circuit by wires, $7^a$ and $7^b$, respectively. A small quantity of mercury may surround the base of each of these rings. It will be understood that the rings $2^a$ and $2^b$ are either themselves magnetic, or carry magnetic armatures.

In the circuit of the device are included magnets, 16, 16, which are adapted to act upon the contact rings, $2^a$ and $2^b$ when the magnets are energized.

The operation of this device is as follows: When the circuit is closed, current will pass through the respective rings $2^a$ and $2^b$, as well as the intermediate portion of the rod 5 and through the action of the magnets 16, 16, the contact rings $2^a$ and $2^b$ will be lifted from the rod, thus cutting it out of circuit. The current will then traverse the gas path between the positive and negative electrodes of the device, and one of the rings $2^a$ or $2^b$ will act as the positive electrode, while the mercury $5^a$ or the mercury $5^b$ will act as the corresponding negative electrode, depending on which way the current is flowing through the device.

If desired, one of the magnets may be made to act more slowly than the other, so that the separation will take place at the corresponding electrode subsequent to the separation at the other electrode.

In some cases it is desirable to heat the vapor within the device, and I have found that the extension of the negative electrode may be employed for that purpose by the initial current passing therethrough, or current from another source may be caused to traverse this extension raising its temperature to the required degree and thus raising the temperature of the device. This heating effect may be discontinued when the vapor has acquired the desired temperature. When the apparatus is in operation the heating current may be discontinued. A wire may be run through any of the apparatus to serve as a heater without interfering with the device.

The present application is a division of another application by the same inventor, the said earlier application having been filed March 23, 1901, and numbered 52,488.

The rings $2^a$ and $2^b$ may be made of such size that the one acting as a positive electrode will become heated by the flow of an excess of current to a point where it will lose its magnetic quality, and thereupon it will cease to be held up by the corresponding magnet, and will therefore fall back to its position of contact, thus substantially cutting the device out and preventing it from being injured; returning, however, to its position of no contact when cooled.

In Fig. 2 I have shown a separate source of current connected with the terminals of the rod 5, such source being represented at 8, a suitable switch, 9, being included in its circuit. The connections, however, may be derived from the same source as the main current, as indicated in Fig. 1 by the conductors 10 and 11 in which case a circuit-breaker, 12, may be included in the circuit leading to the device and adapted to act only after such an interval as will afford the proper amount of heating to the device. This initial heating action may be more fully explained as follows: Considering first the connection in which the separate source is used for heating the container as illustrated in Fig. 2, it is evident that upon the closure of the switch 9, current will flow from the generator 8, through the device. The conductor 5, which must be proportioned suitably to take the proper amount of current from the generator 8, to heat the device, will then dissipate the energy of the current and produce the desired physical condition in the apparatus. The arrangement shown is economical and advantageous, since in the absence of series resistance or other auxiliary devices in the leads of the generator 8, all the energy there supplied, goes toward heating the conductor. It is evident that other arrangements might be used without departing from the present invention. When the object of the preliminary heating has been secured, the supply of energy from the generator 8, may be discontinued by the opening of the switch 9. Considering now the connection in which the heating current is received from the same source as the normal energy supply, shown in Fig. 1, a similar result is produced. Upon the application of potential to the mains of the device, a double flow of current takes place; first, through the heating circuit by way of the conductors 10 and 11 and the circuit breaker 12. Here, as before, the conductor 5, which must be suitably proportioned to the voltage of the supply, receives current and generates heat which will produce the desired effect. Here, as in Fig. 2, the proportioning of the conductor to receive current directly from the supply without waste in external controlling devices, adds to the efficiency and economy of the system. It is evident, however, that other arrangements might be used without departing from the present invention. Upon the application of potential current will also flow from the supply through a second circuit containing the magnets 16 and the electrodes 5ª and 5ᵇ and the rings 2ª and 2ᵇ, and the conductor 5. This current will operate the magnets 16 and their corresponding armatures 2ª and 2ᵇ, which will start the device when the proper condition is produced by the initial heating current as already described. The arrangement shown provides for the continuous flow of heating current in the initial stages before the normal operation of the apparatus independently of the making and breaking of contact by the rings 2ª and 2ᵇ. It is, however, to be noted that both paths receive their current from the same source and are supplied with the same potential, and, further, that the heating conductor 5, before it is cut out of circuit, receives the full line potential, whereas the vapor path within the device will usually receive a less voltage. It is important to notice that the specific device and circuits shown in this figure is very often not only well adapted to economically and efficiently supply initial heating to the container in view of the absence of external energy consuming controlling devices, but that it is also especially well adapted to facilitate the starting operation. Since the voltage impressed upon the conductor 5 is usually higher than that impressed upon the vapor column, its resistance is comparable with that of the vapor column and relatively higher. This condition has been found in actual practice under certain conditions to facilitate greatly the extension of the current between the electrodes.

I claim as my invention:—

1. In an electric gas or vapor apparatus of the character described, the combination with a negative electrode, a positive electrode, and means for forming a solid electrical connection between the two electrodes within the apparatus, of electro-magnets acting to sever such connection, one of the said magnets being adapted to act more slowly than the other.

2. In an electric gas or vapor apparatus of the class described, the combination with a negative electrode and a positive electrode, of means for forming a solid electrical connection between the two electrodes within the apparatus, such means consisting of a metallic conductor which is adapted to carry the normal current without excessive heating, but which will become heated to a red heat by the flow of an excess of current.

3. In a gas or vapor electric apparatus, the combination of a positive electrode, a negative electrode and an extension of one of the electrodes reaching between the electrodes, said extension constituting means for forming a solid electrical connection between the two electrodes within the apparatus, together with means for interrupting such connection near one electrode and means for subsequently separating said extension from the other electrode at or near one end.

4. In an electric gas or vapor apparatus of the character described, the combination with a vaporizable negative electrode and a positive electrode, of means for forming a solid electrical connection between the said electrodes within the apparatus, such connection including said anode and depending upon magnetic material in connection therewith, which material is adapted to carry the normal current without excessive heating but which will become heated to a red heat by the flow of excessive current, the said magnetic conductor being acted upon by a magnet for severing the connection between said conductor and the solid electrical connection between the electrodes.

5. In a gas or vapor electric apparatus, the combination of a negative electrode, a positive electrode, means for forming a solid electrical connection between the electrodes within the apparatus, means for severing such connection at one of said electrodes, and means for subsequently severing such connection at the other electrode.

6. In a gas or vapor electric apparatus, the combination of a negative electrode, a positive electrode, means for forming a solid electrical connection between the electrodes within the apparatus, and means for severing such connection at a plurality of points.

7. In a gas or vapor electric apparatus, a plurality of electrodes therein, means for forming a solid electrical connection between the electrodes within the apparatus, and means for severing such connection at a plurality of electrically intermediate points.

8. In a gas or vapor electric apparatus, a plurality of electrodes therein, means for forming a solid electrical connection between the electrodes within the apparatus, and means for severing such connection at a plurality of electrically intermediate points in succession.

9. In a gas or vapor electric apparatus, the combination of a container, electrodes therein, means for forming conductive connection between the electrodes within the apparatus, and means for severing such connection at a plurality of points.

10. In a gas or vapor electric apparatus, the combination of a container, electrodes therein, means for forming conductive connection between the electrodes within the apparatus, and means for severing such connection at a plurality of points in succession.

11. In an electric gas or vapor apparatus of the character described, the combination with a negative electrode, a positive electrode, and means for forming a conductive connection between the two electrodes within the apparatus, of electro-magnets acting to sever such connection, one of the said magnets being adapted to act more slowly than the other.

12. In a gas or vapor electric apparatus, the combination of a negative electrode, a positive electrode, means for forming a conductive connection between the two electrodes within the apparatus, means for severing such connection at the positive electrode, and means for subsequently severing the connection at the negative electrode.

13. In a gas or vapor electric apparatus, a container, electrodes therein, a conducting rod extending through at least a portion of the said container, rings adapted to rest against said rod and connected, respectively, with the positive and negative electrodes within the apparatus, and means for removing the said rings from contact with the rod.

14. In a gas or vapor electric apparatus, a container, electrodes therein, a conducting rod extending through at least a portion of the said container, rings adapted to rest against said rod and connected, respectively, with the positive and negative electrodes within the apparatus, and means for successively removing the said rings from contact with the rod.

15. In a gas or vapor electric apparatus, a container, electrodes therein, a conducting rod extending through at least a portion of the said container, rings adapted to rest against said rod and connected, respectively, with the positive and negative electrodes within the apparatus, and means for removing the said rings from contact with the rod, such means consisting of electro-magnets adapted to act upon the said rings.

16. In a gas or vapor electric apparatus, a container, electrodes therein, a conducting rod extending through at least a portion of the said container, rings adapted to rest against said rod and connected, respectively, with the positive and negative electrodes within the apparatus, and means for successively removing the said rings from contact with the rod, such means consisting of electro-magnets adapted to act upon the said rings, one of the said magnets being relatively sluggish in its action.

17. In an electric gas or vapor apparatus of the class described, the combination with a negative electrode and a positive electrode, of means for forming a solid electrical connection between the two electrodes within the apparatus, such means consisting of a metallic conductor which is adapted to carry the normal current without excessive heating, but which will become heated to a red heat by the flow of an excess of current, and a cut-out in the circuit leading to the apparatus.

18. The combination with a gas or vapor electric apparatus comprising a conducting gas or vapor, a positive electrode and a negative electrode therefor, of a conductor between the positive and the negative electrode, and means for severing the said conductor near both electrodes.

19. The combination with a gas or vapor electric apparatus comprising a conducting gas or vapor, a positive and a negative electrode therefor, of a conductor between the positive and the negative electrode, and automatic means for severing the said conductor near both electrodes.

20. The combination with a gas or vapor electric apparatus comprising a conducting gas or vapor, a positive and a negative electrode therefor, of a conductor between the positive and the negative electrode, and means for successively severing the said conductor near both electrodes.

21. The combination with a gas or vapor electric apparatus comprising a conducting gas or vapor, a positive electrode and a negative electrode therefor, of a conductor between the positive and the negative electrode, and automatic means for successively severing the said conductor near both electrodes.

22. The combination with a gas or vapor electric apparatus comprising a conducting gas or vapor, a positive and a negative electrode therefor, of a conductor between the positive and the negative electrode, and electro-magnetic means for severing the said conductor near both electrodes.

23. The combination with a gas or vapor electric apparatus comprising a conducting gas or vapor, a positive electrode and a negative electrode therefor, of a conductor between the positive and the negative electrode, and electro-magnetic means for successively severing the said conductor near both electrodes.

24. The combination with a gas or vapor electric apparatus comprising a conducting gas or vapor, a positive and a negative electrode therefor, of a conductor between the positive and the negative electrode, and automatic means for severing the said conductor near both electrodes, the rupture of the positive electrode taking place prior to that at the negative.

25. The combination with a gas or vapor electric apparatus comprising a conducting gas or vapor, a positive electrode and a negative electrode therefor, of a conductor between the positive and the negative electrode, and automatic means for successively severing the said conductor near both electrodes, the rupture of the positive electrode taking place prior to that at the negative electrode.

26. The combination with a gas or vapor electric apparatus comprising a conducting gas or vapor, a positive electrode and a negative electrode therefor, of a conductor between the positive and the negative electrode, and electro-magnetic means for successively severing the said conductor near both electrodes, the rupture of the positive electrode taking place prior to that at the negative electrode.

27. In a gas or vapor apparatus of the character described, the combination of a positive electrode, a negative electrode, means for forming a solid connection between the two electrodes, means for heating the apparatus by the passage of electric current through the solid connection, and means for interrupting the solid connection between the electrodes.

28. In a gas or vapor electric apparatus of the character described, an inclosing envelop, electrodes therein, a conducting gas or vapor, a solid heating conductor inside the apparatus, and means for causing the same to furnish heat to the apparatus only during the starting period.

29. In a gas or vapor electric apparatus of the character described, an inclosing envelop, electrodes therein, a conducting gas or vapor, a solid heating conductor inside the apparatus operative prior to the starting of the device, and means for short-circuiting the heat conductor when the apparatus is in operation.

30. In a gas or vapor electric apparatus of the character described, a hermetically sealed container, two electrodes within the same, one of which is volatilizable, a conducting gas or vapor between the electrodes, one electrode having a projection in the form of a solid conductor extending into electrical connection with the other electrode, and means for cutting the projection out of circuit when the apparatus is in operation.

31. In a gas or vapor apparatus of the character described, a hermetically sealed container, two electrodes within the same, a conducting gas or vapor between the electrodes, one electrode having a projection in the form of a solid conductor extending into electrical connection with the other electrode, in combination with means brought into operation by the current traversing the apparatus when in operation for completely cutting the said projection out of circuit.

32. In a gas or vapor apparatus of the character described, a hermetically sealed container, two electrodes within the same, a conducting gas or vapor between the electrodes, one electrode having a projection of the form of a solid conductor extending into electrical connection with the other electrode, and means for cutting the projection out of circuit when the apparatus is in operation.

33. In a vapor electric apparatus, the combination of electrodes one at least of which is of vaporizable material, and a high resistance filament or conductor normally connecting the electrodes.

34. In a vapor electric apparatus, the combination of electrodes of vaporizable material, a filament extending from one electrode to another, and means for disconnecting the filament.

35. In a gas or vapor electric apparatus of the character described, an inclosing envelop, electrodes therein, a conducting gas or vapor, a solid heating conductor inside the apparatus, and means for causing the same to furnish heat to the apparatus only during the starting period.

36. In a gas or vapor electric apparatus of the character described, an inclosing envelop, electrodes therein, a conducting gas or vapor, a solid heating conductor inside the apparatus adapted to furnish initial heat thereto, and means for short-circuiting the heating conductor when the apparatus is in condition.

37. In a gas or vapor electric apparatus of the character described, a hermetically sealed container, two electrodes within the same, one of which is vaporizable, a conducting gas or vapor between the electrodes, one electrode having a projection in the form of a solid conductor extending into electrical connection with the other electrode, and means for cutting the projection out of circuit when the apparatus is in operation.

38. In a gas or vapor apparatus of the character described, a hermetically sealed container, two electrodes within the same, a conducting gas or vapor between the electrodes, one electrode having a projection in the form of a solid conductor extending into electrical connection with the other electrode, in combination with means brought into operation by the current traversing the apparatus when in operation for completely cutting the said projection out of circuit.

39. In a gas or vapor apparatus of the character described, a hermetically sealed container, two electrodes within the same, a conducting gas or vapor between the electrodes, one electrode having a projection of the form of a solid conductor extending into electrical connection with the other electrode, and means for cutting the projection out of circuit when the apparatus is in operation.

40. In a vapor electric apparatus, a combination of electrodes one at least of which is adapted to emit vapor, and a high resistance filament or conductor normally connecting the electrodes.

41. In a vapor electric apparatus, the combination of electrodes adapted to emit vapor, a filament extending from one electrode to another, and means for disconnecting the filament.

42. A starting means for vapor electric device, comprising an electric circuit therein, means located in said device for generating heat from current flow in said circuit, and a cut out for said starting circuit, means for delaying the action of said cut out for a certain period.

43. In an apparatus of the class described, the combination of a container, a negative electrode, a positive electrode, a filamentary electrode extending from the vicinity of the positive electrode to the vicinity of the negative electrode, connections for the several electrodes, and a resistance in the connections to the filamentary electrode.

44. In a vapor electric apparatus, the combination of an envelop or container, a negative electrode, a positive electrode, a filament extending from the vicinity of the positive electrode to the vicinity of the negative electrode, connections for the several electrodes, connections for the filament and the electrode, and a resistance in the connections to the filament.

Signed at New York, in the county of New York, and State of New York, this fifteenth day of September A. D. 1902.

PETER COOPER HEWITT.

Witnesses:
REGINALD BEIFIELD,
WM. H. CAPEL.